United States Patent
Hoffman (10) Patent No.: US 12,092,350 B2
(45) Date of Patent: Sep. 17, 2024

(54) SYSTEM, METHOD AND APPARATUS FOR USING SECURITY SENSORS IN CONNECTION WITH A THERMOSTAT

(71) Applicant: Universal Electronics Inc., Scottsdale, AZ (US)

(72) Inventor: Michael Hoffman, San Diego, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 315 days.

(21) Appl. No.: 17/485,783

(22) Filed: Sep. 27, 2021

(65) Prior Publication Data

US 2023/0098044 A1     Mar. 30, 2023

(51) Int. Cl.
G06F 1/20       (2006.01)
F24F 11/46      (2018.01)
F24F 11/58      (2018.01)
F24F 110/10     (2018.01)

(52) U.S. Cl.
CPC .............. *F24F 11/58* (2018.01); *F24F 11/46* (2018.01); *F24F 2110/10* (2018.01); *Y02D 10/00* (2018.01)

(58) Field of Classification Search
CPC ..................................................... Y02D 10/00
See application file for complete search history.

(56) References Cited

U.S. PATENT DOCUMENTS

| | | | |
|---|---|---|---|
| 6,196,468 B1* | 3/2001 | Young | H04L 67/12 236/46 C |
| 7,925,383 B2* | 4/2011 | Kwon | G05B 19/042 700/19 |
| 11,170,593 B1* | 11/2021 | Schneider | G06Q 10/063 |
| 2005/0090915 A1* | 4/2005 | Geiwitz | G05B 15/02 700/275 |
| 2015/0355649 A1* | 12/2015 | Ovadia | G08B 19/00 704/233 |
| 2018/0057012 A1* | 3/2018 | Delgado | E05F 15/697 |
| 2019/0113896 A1 | 4/2019 | Hall et al. | |
| 2020/0262268 A1* | 8/2020 | Williams | B60H 1/00828 |
| 2021/0071889 A1 | 3/2021 | Picardi et al. | |
| 2022/0397295 A1* | 12/2022 | Sadanandan | F24F 11/0008 |

FOREIGN PATENT DOCUMENTS

WO    2015/200342 A1    12/2015

OTHER PUBLICATIONS

ISA/US, Int. Search Report and Written Opinion issued PCT application No. PCT/US22/43331, dated Jan. 6, 2023, 15 pages.

* cited by examiner

*Primary Examiner* — Suresh Suryawanshi
(74) *Attorney, Agent, or Firm* — Greenberg Traurig, LLP (57) ABSTRACT

A system, apparatus and method for deactivating HVAC equipment when the thermostat determines that a door or a window has been opened. The thermostat determines that a door or window is open using one or more security sensors previously installed for use with a separate security system.

14 Claims, 6 Drawing Sheets

SYSTEM, METHOD AND APPARATUS FOR USING SECURITY SENSORS IN CONNECTION WITH A THERMOSTAT

BACKGROUND

I. Field of Use

The present application relates to the field of heating, ventilation and air conditioning. More specifically, the present application relates to the use of security sensors in connection with a thermostat.

II. Description of the Related Art

Heating, ventilation and air conditioning (HVAC) equipment is used to heat and cool indoor environments, comprising central or local air conditioners and heating systems. Such HVAC components are typically controlled by one or more thermostats located in one or more rooms of a structure. When the ambient air temperature in a room rises or falls past a temperature threshold, or "temperature setpoint", a thermostat sends heat/cool control signals to the heating and cooling equipment, which regulates the ambient air temperature at or near the temperature setpoint.

The ambient air temperature inside a structure may be influenced by several factors, including whether any doors or windows are open. For example, when it is hot outside, and a thermostat operates in a cooling mode with a temperature setpoint of 75 degrees, an open door or window that allows the hot, outside air inside will generally cause cooling equipment to run longer and more frequently to cool the ambient air temperature to the temperature setpoint, if it is able to do so at all.

It would be desirable for a thermostat to know if any doors or windows are open so that the thermostat could deactivate HVAC equipment so to minimize energy waste.

SUMMARY

The embodiments described herein relate to methods, systems, and apparatus for deactivating HVAC equipment when the thermostat determines that a door or a window has been opened. In one embodiment, a thermostat is described, comprising a memory for storing processor-executable instructions, a wireless receiver for receiving security alerts from one or more security sensors, an HVAC communication interface for interfacing with HVAC equipment, a processor coupled to the memory, the wireless receiver and the communication interface, for executing the processor-executable instructions that causes the thermostat to enroll, by the processor, a security sensor, the security sensor actively enrolled with a security system, receive, by the processor via the wireless receiver, a security alert from the security sensor, and deactivating, by the processor, the HVAC equipment in response to receiving the security alert.

In another embodiment, a method is described, performed by a thermostat, comprising enrolling, by a processor of the thermostat, a security sensor, the security sensor actively enrolled with a security system, receiving, by the processor via a wireless receiver coupled to the processor, a security alert from the security sensor, and deactivating, by the processor, the HVAC equipment in response to receiving the security alert.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to systems, methods and apparatus for deactivating HVAC equipment when a thermostat determines that a door or window is open. The thermostat uses one or more actively-enrolled wireless security sensors, such as door or window security sensors, to determine when a door or a window is open. "Actively-enrolled" means that the security sensors additionally communicate with a security system, to detect door or window openings, and to cause an alarm to occur when the security system is in an armed-home or armed-away mode of operation. Thus, security sensors perform two functions: to alert a security system of unauthorized entry when the security system is armed, and to deactivate HVAC equipment when a security sensor indicates that a door or a window is open. This results in a lower thermostat cost, as door and/or window security sensors specifically designed for the thermostat do not have to be deployed.

Figure 1:
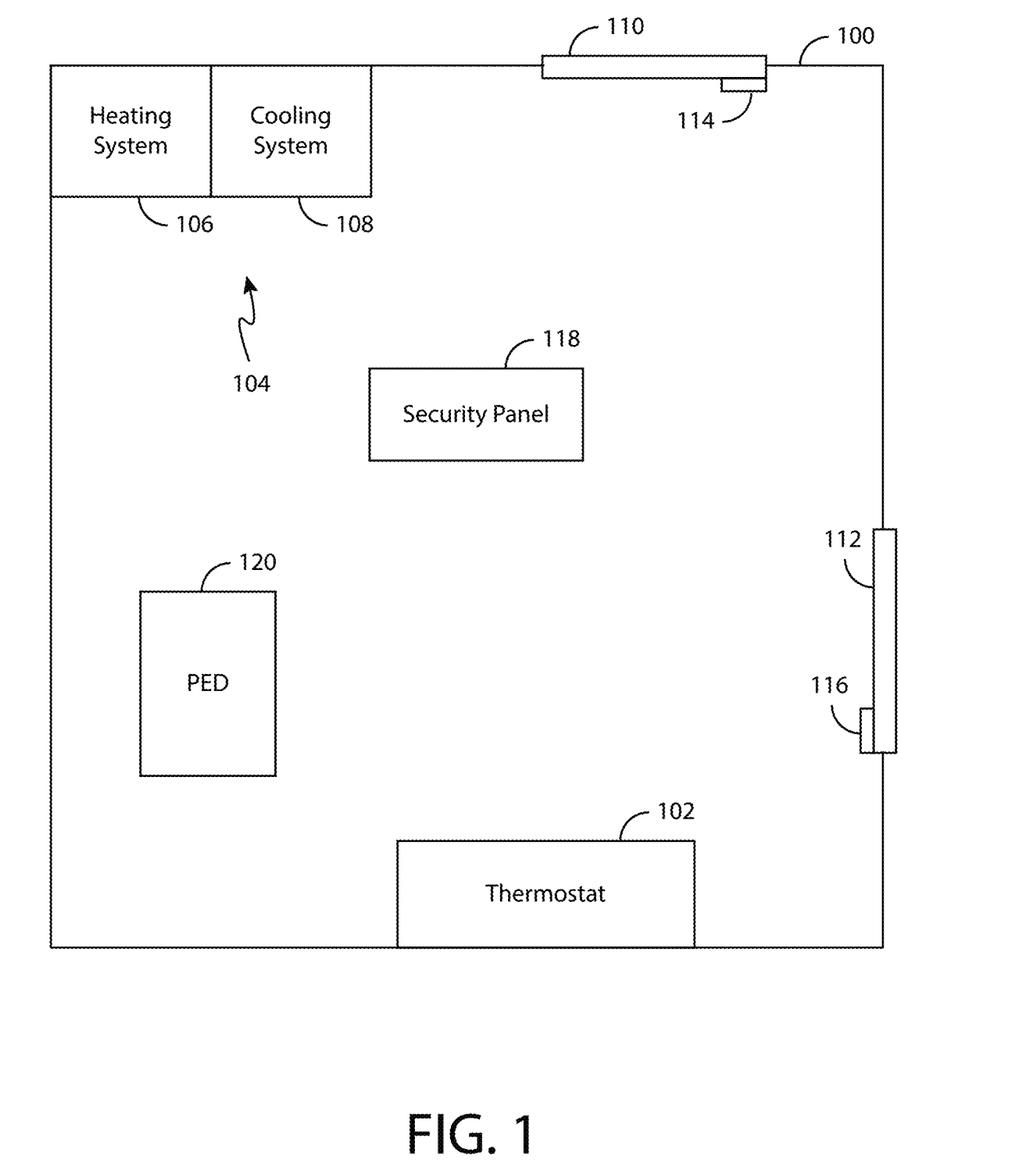
FIG. 1 is a top, plan view of a structure comprising a thermostat and HVAC equipment comprising one or both of a heating system and a cooling system.

FIG. 1 is a top, plan view of a structure 100 comprising a thermostat 102 and HVAC equipment 104 comprising one or both of a heating system 106 and a cooling system 108. Although structure 100 is shown as a residence comprising a single area or room, it should be understood that the concepts described herein could be applied to other types of structures, for example commercial warehouses, office buildings, and hotels, and that a structure may comprise two or more rooms, where the ambient air inside each room is controlled by thermostat 102 or by two or more separate thermostats, each thermostat responsible for controlling the ambient air temperature of one or more areas or rooms. It should also be understood that in some embodiments, thermostat 102 may utilize one or more remote temperature sensors for determining ambient air temperatures in an area proximate to each temperature sensor. In these embodiments, thermostat 102 may control the ambient air temperature in multiple areas using one or more heating and/or cooling systems.

Heating system 106 may comprise a home or office central heating system and/or one or more smaller heaters configured for heating smaller spaces, such as a bedroom, an office in an office building or a hotel room in a hospitality application. Cooling system 108 may comprise a home or office central air conditioning system and/or one or more smaller air conditioners, such as one or more window mounted air conditioners or free standing room air conditioners designed to cool smaller spaces, such as a bedroom, an office in an office building or a hotel room in a hospitality application. Reference to "HVAC equipment 104" herein may refer to heating system 106, cooling system 108, or both.

Also shown in FIG. 1 is door 110, monitored by wireless door security sensor 114 and window 112, monitored by wireless window security sensor 116. Window 112, in this example, is located near to thermostat 102, for example, between 2 and 10 feet away, while door 110 is located some distance away from thermostat 102, in this example, 20 feet or more. Each of wireless door security sensor 114 and wireless window security sensor 116 are each well-known wireless security sensors that detect when a respective door or window is opened or closed. Upon detection, each sensor transmits a security alert to security panel 118, indicating that a door or a window has been opened or closed, and security panel 118 determines whether to cause an escalated security response to occur, such as sounding one or more local, very loud sirens (not shown) or notifying a remote monitoring center so that police may be dispatched to structure 100. The escalated security response may occur when security panel 118 is operating in an "armed-home" or an "armed-away" mode of operation when a security alert is received from one or more of the security sensors. Security panel 118 may additionally monitor other door and window security sensors for monitoring one or more other doors and windows, respectively, and/or one or more other types of security sensors, such as one or more glass break sensors, motion detectors, garage door tilt sensors, etc. The security sensors and security panel 118 may be referred to herein as a "security system". Security sensors 114 and 116 typically communicate wirelessly with security panel 118 using one or more standard, commercial communication protocols, such as the well-known Z-Wave or Zigbee protocols, Wi-Fi, Bluetooth, etc.

Embodiments of the present invention are intended to make use of already-installed security sensors by thermostat 102, so that thermostat 102 can control HVAC equipment 104 based on security alerts transmitted by the security sensors when a door or a window is opened. The security alerts are additionally received by the security alerts transmitted by sensors 114 and 116 (i.e., in addition to being received by security panel 118). This saves money by not having to install additional door or window security sensors for use by thermostat 102.

In some embodiments, one or both sensors 114 and 116 are "learned-in" or "enrolled" into thermostat 102 so that thermostat 102 knows about the presence of such security sensor and may thereby receive security alerts from one or both security sensors when a door or a window is opened. Enrolling security sensors into security panels is well-known in the art.

During operation, thermostat 102 may be programmed with one or more setpoints.

Setpoints are well known in the HVAC art, comprising a desired day, time and temperature programmed into thermostat 102, for maintaining the desired temperature, or "setpoint" temperature, at the setpoint day and time. For example, one setpoint may indicate a setpoint temperature of 72 degrees, Monday-Friday, between the hours of 8 am and 5 pm. During cold weather, thermostat 102 monitors the ambient air temperature of an area monitored by thermostat 102 and/or one or more remote temperature sensors, and controls HVAC equipment 104, in this case heating system 106, to heat the area until the ambient air temperature meets or exceeds the setpoint temperature of 72 degrees. Conversely, in hot weather, the setpoint temperature may be set to 68 degrees, for example, and thermostat 102 calls for cooling system 108 to cool the area until the ambient air temperature is at or below the setpoint temperature of 68 degrees.

When door 110 is opened, or when window 112 is opened, door security sensor 114 or window security sensor 116, respectively, transmits a security alert to security panel 118, and security panel 118 processes the alert in order to determine if it should initiate an escalated security response. However, separately, the security alert is additionally received by thermostat 102, as one or both of these security sensors have been previously enrolled with thermostat 102. Upon receipt of the security alert, thermostat 102 determines whether to deactivate HVAC equipment 104, i.e., prevent HVAC equipment 104 from either heating or cooling during an active heating or cooling cycle, or when a new setpoint is reached (i.e., the day and time correspond to a setpoint day and time), in order to stop wasteful heating or cooling while a door or window is open. When door 110 and/or window 112 is/are closed, sensors 114 and 116, respectively, transmit a security alert that is received by both security panel 118 and thermostat 102. Upon receipt of the door/window close security alert, thermostat 102 may re-start heating or cooling that was previously stopped by thermostat 102 or allow heating or cooling to begin when a new setpoint is reached.

Figure 2:
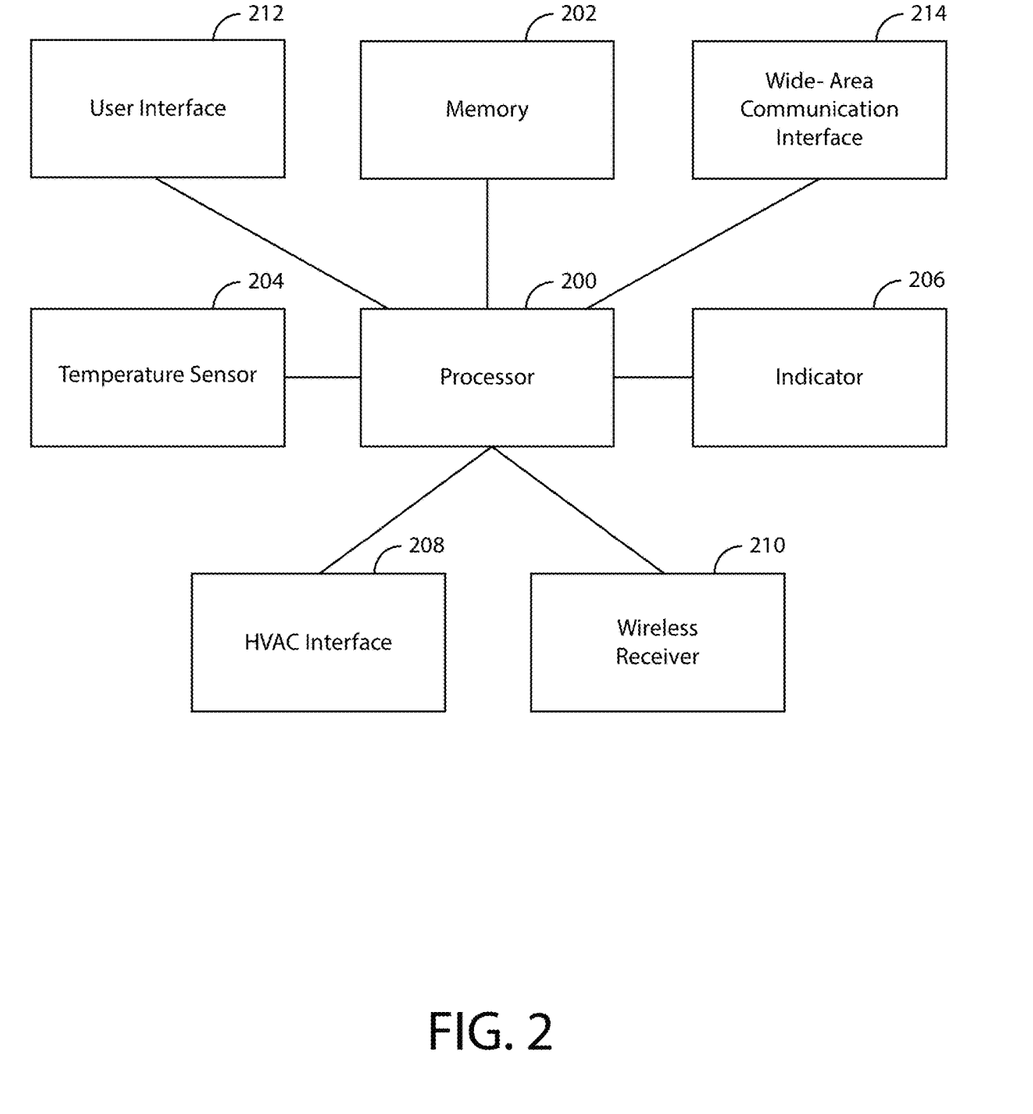
FIG. 2 is a functional block diagram of one embodiment of the thermostat shown in FIG. 1 in accordance with the inventive principles described herein.

FIG. 2 is a functional block diagram of one embodiment of thermostat 102 in accordance with the inventive principles described herein. FIG. 2 shows a processor 200, a memory 202, a temperature sensor 204, an indicator 206, an HVAC communication interface 214, a wireless receiver 210, a user interface 212, and a wide-area communication interface 216. It should be understood that not all of the functional blocks shown in FIG. 2 are required for operation of thermostat 102, that the functional blocks may be connected to one another in a variety of ways, and that not all functional blocks are necessary for operation of the sensor are shown (such as a power supply), for purposes of clarity.

Processor 200 is configured to provide general operation of thermostat 102 by executing processor-executable instructions stored in memory 202, for example, processor-executable code. Processor 200 typically comprises a general purpose processor, although any one of a variety of microprocessors, microcomputers, and/or microcontrollers may be used alternatively.

Non-transitory memory 202 is coupled to processor 200, comprising one or more information storage devices, such as RAM, ROM, EEPROM, UVPROM, flash memory or other type of electronic, optical, or mechanical memory device. Memory 202 is used to store processor-executable instructions for operation of thermostat 102 as well as any information used by processor 200, such as temperature and day/time setpoints, identification information of thermostat 102 (i.e., a serial number), instructions on how to deactivate HVAC equipment 104 when a security alert is received from an enrolled door or window security sensor, etc. In some embodiments, all or a portion of memory 202 may be incorporated with processor 200, i.e., in the case of a microprocessor with onboard static and/or dynamic RAM capability.

Temperature sensor 204 is coupled to processor 400 and provides electronic signals to processor 200 representative of an ambient temperature of an area inside structure 100 and proximate to thermostat 102. Temperature sensor 204 may comprise a mechanical-based or solid-state device that is well-known in the art.

Indicator 206 is coupled to processor 200 and is used to provide a visual and/or audible alert to persons inside structure 100 when thermostat 102 has deactivated HVAC equipment 104 after receiving at least one security alert from a door or window security sensor. In one embodiment, indicator 206 may comprise one or more light-emitting diodes (LEDs), a piezo-electric speaker, or some other well-known device to provide a visual and/or audible indication to a user present within structure 100.

HVAC communication interface 214 is coupled to processor 200 and to HVAC equipment 104, configured for communicatively coupling thermostat 102 to HVAC equipment 104. HVAC communication interface 214 comprises circuitry for wireless and/or wired transmission, such as a wireless RF transmitter compatible with an RF receiver in HVAC equipment 104 or simply a switch or relay for opening or completing one or more wired circuits from HVAC equipment 104, as is commonly used in the art. HVAC communication interface is used by processor 200 to activate or deactivate HVAC equipment 104, i.e., to begin or stop heating or cooling, or to disable heating or cooling during a heating or cooling cycle, or between heating or cooling cycles, when a door or window has been opened.

Wireless receiver 210 is coupled to processor 200 and is configured for receiving security alerts and possibly other transmissions from security sensors such as security sensors 114 and/or 116. Wireless receiver 210 may comprise well-known circuitry configured for one or more particular wireless protocols, such as one or more professional security protocols (i.e., Honeywell®, 2Gig®, Interlogix), Wi-Fi, Bluetooth, Z-Wave, Zigbee, etc. Such receivers are well-known in the art. In one embodiment, wireless receiver 210 is additionally used to communicate with HVAC equipment 104, in an embodiment where HVAC equipment 104 and the security sensors use the same wireless communication protocol.

User interface 212 is coupled to processor 200 and configured for receiving user input, such as setpoint information (i.e., desired temperatures and days/times to maintain such temperatures), sensor information (i.e., an identification of one or more door and/or window security sensors, a location of such sensor(s) (i.e., front door, sliding door, window near thermostat, etc.). User interface 212 typically comprises one or more pushbuttons, knobs, a touchscreen display, etc. In one embodiment, user interface 212 alternatively, or in addition, comprises personal electronic device 120, such as a mobile phone, desktop, laptop or tablet computer, a wearable device such as a smart watch, etc.

Wide-area communication interface 216 is coupled to processor 200, configured for sending and/or receiving information to/from personal electronic device 120 that may be located within or remotely from structure 100. Typically, wide-area communication interface 216 comprises circuitry and firmware to communicate with a local Wi-Fi network (not shown), which in turn is coupled to the Internet (not shown).

Figure 3A:
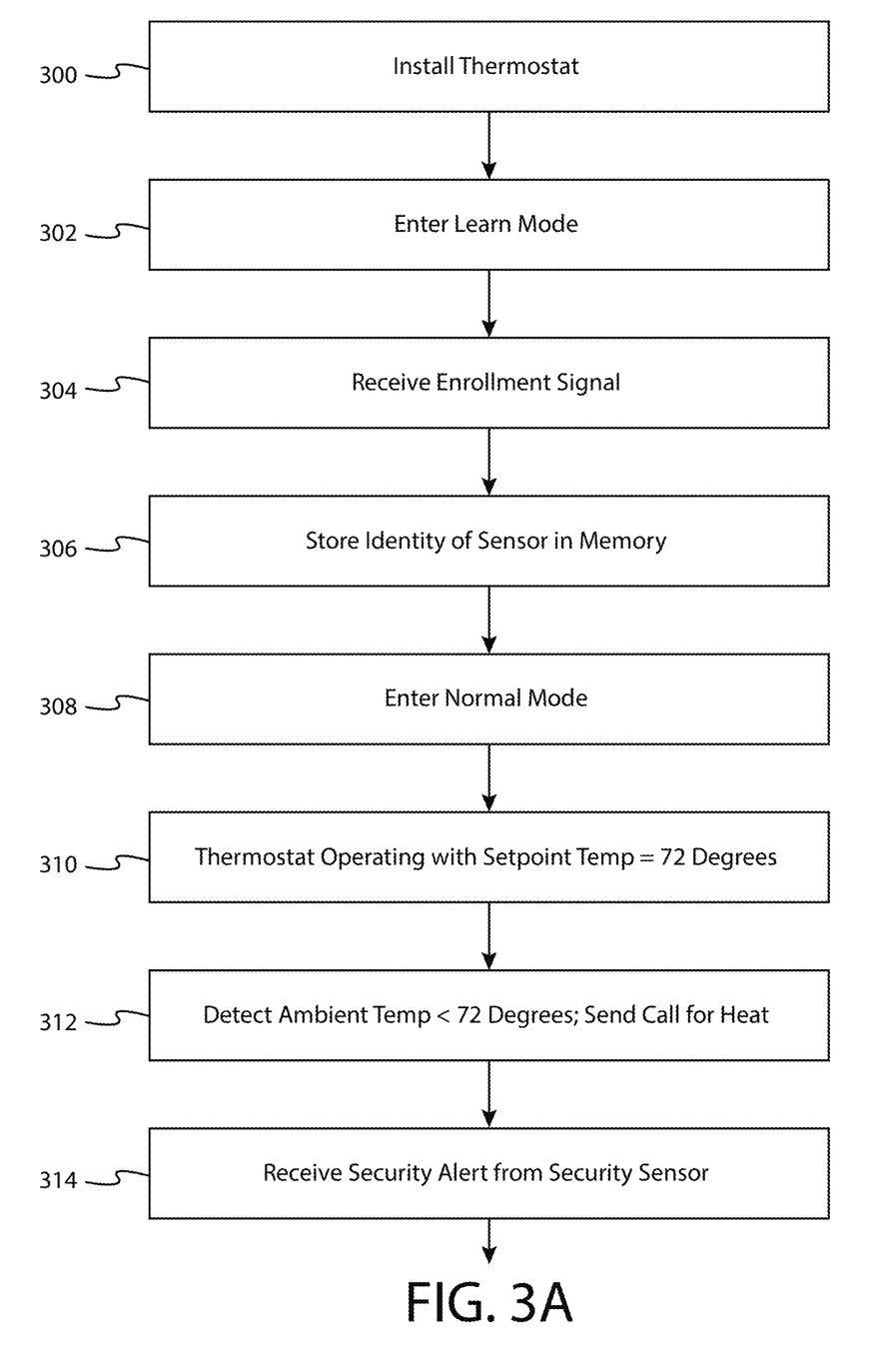
FIGS. 3A and 3B are flow diagrams illustrating one embodiment of a method, performed by the thermostat as shown in FIGS. 1 and 2, for deactivating the HVAC equipment shown in FIG. 1 when the thermostat determines that a door or a window has been opened.
Figure 3B:
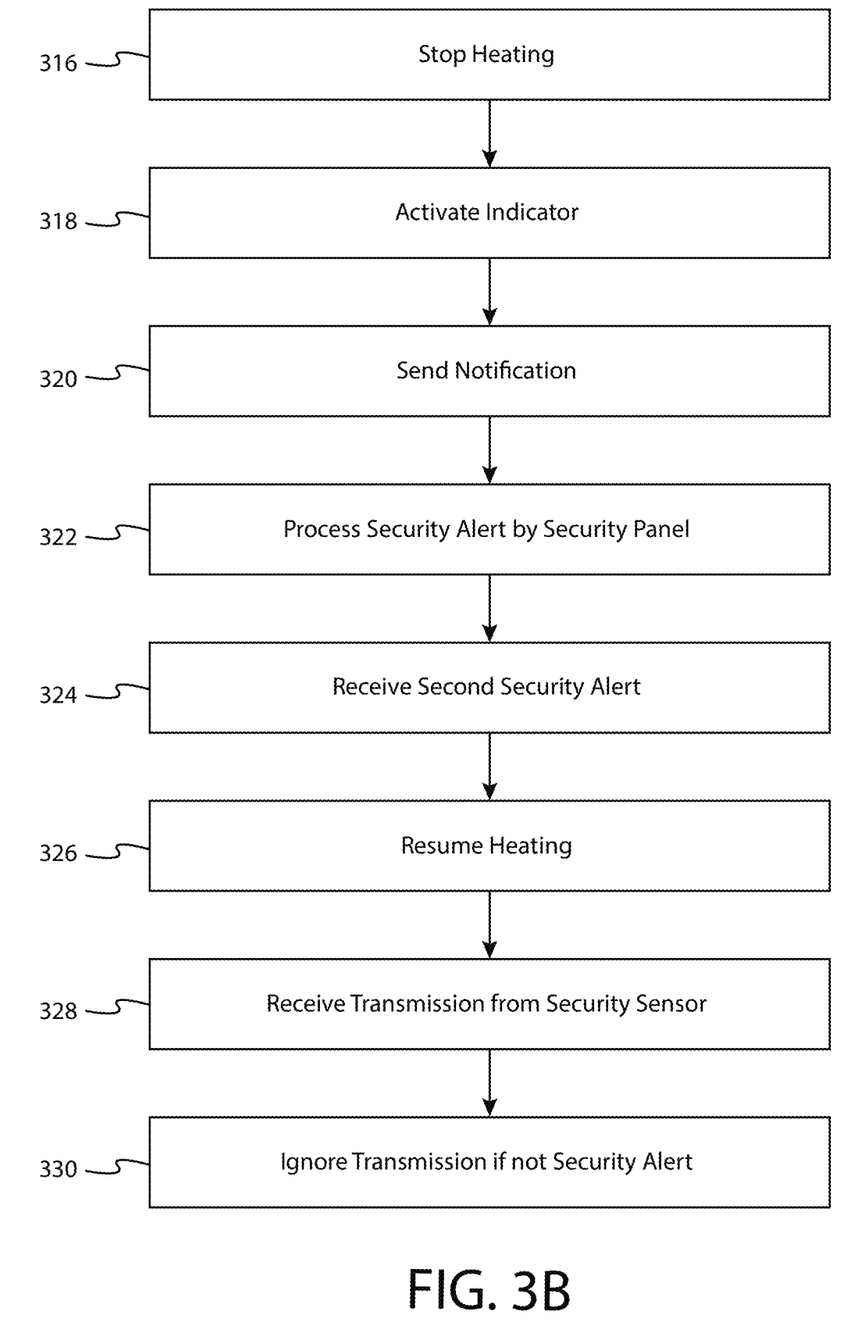

FIGS. 3A and 3B are flow diagrams illustrating one embodiment of a method, performed by thermostat 102, for deactivating HVAC equipment 104 when thermostat 102 determines that a door or a window has been opened. It should be understood that the method described herein with respect to FIG. 3 could alternatively be performed by personal electronic device 120 or by an HVAC component other than thermostat 102, such as by heating system 106, cooling system 108, etc. It should also be understood that in some embodiments, not all of the method steps shown in FIG. 3 are performed, and that the order in which the steps are performed may be different in other embodiments.

At block 300, thermostat 102 is installed inside structure 100. Security panel 118 and at least door and window security sensors 114 and 116, respectively, typically have been pre-installed before installation of thermostat 102. That is, door security sensor 114 and window security sensor 116 have each been previously "enrolled" or "learned" into security panel 118, so that security panel 118 may begin monitoring such security sensors. Such enrollment may be referred to herein as "active enrollment" or "actively enrolled" to indicate that security panel 118 will process security alerts, and other transmissions, broadcast by such enrolled security sensors. Enrollment is a well-known process for introducing wireless sensors into a local monitoring device, such as security panel 118. Enrollment allows security panel 118 to know the number and type of sensors that are monitoring structure 100, and to respond to security alerts and other transmissions only from security sensors that have been enrolled into security panel 118.

In another embodiment, thermostat 102 may be installed inside structure 100 before security panel 118 and door and window security sensors 114 and 116, respectively. In this embodiment, door and window security sensors 114 and 116, respectively, are enrolled into thermostat 102 first, and then later enrolled with security panel 118.

At block 302, a user of thermostat 102 may place thermostat 102 into a "learn" mode, or "enrollment" mode of operation using user interface 212 or using an app installed on personal electronic device 120. Processor 200 receives a signal via user interface 212 or wide-area communication interface 214, as the case may be, instructing processor 200 to enter the enrollment mode of operation.

At block 304, after entering the enrollment mode of operation, processor 200 receives an enrollment signal via wireless receiver 210, from a security sensor, such as door security sensor 114. The enrollment signal comprises at least an identity of door security sensor 114, such as a serial number, MAC address, or some other unique identification code. The enrollment signal may be generated by door security sensor 114 upon the user opening door 110, causing door security sensor 114 to transmit a security alert. In another embodiment, a user may open a case of door security sensor 114 which causes door security sensor 114 to transmit a "tamper" security alert. The enrollment signal may be generated using other techniques well-known in the art.

At block 306, after receiving the enrollment signal, processor 200 stores the identity of door security sensor 114 in memory 202.

Blocks 304 and 306 may be repeated for other sensors, such as window security sensor 116.

At block 308, after one or more sensors have been enrolled, processor 200 exits the enrollment mode of operation and enters a normal mode of operation, i.e., monitoring the ambient air temperature inside structure 100, using temperature sensor 204, and/or one or more remote temperature sensors, and activating HVAC equipment 104 when setpoints are met or exceeded, i.e., actively heating or cooling the ambient air. The normal mode of operation may comprise a heating mode of operation, where heating system 106 is used to heat the ambient air temperature inside structure 100 when the ambient air temperature falls below a temperature setpoint, a cooling mode of operation, where cooling system 108 is used to cool the ambient air temperature inside structure 100 when the ambient air temperature rises above a temperature setpoint, or both modes together.

At block 310, processor 200 is operating with a current temperature setpoint of 72 degrees in a heating mode of operation. Heating system 106 is presently inactive, i.e., it is not actively heating the ambient air inside structure 100. The remainder of the discussion with respect to FIG. 3 shall use this setpoint and mode of operation as an illustrative example. However, the same inventive concepts may be used with a different setpoint in the same, or different, operating mode.

At block 312, processor 200 detects, via temperature sensor 204, that the ambient air temperature inside structure 100 has dropped below the setpoint of 72 degrees. In response, processor 200 sends a command or otherwise causes heating system 106, via HVAC communication interface 208, to begin heating the ambient air within structure 100. This command may be referred to as a "call" for heat. It may take anywhere between 5 minutes and 30 minutes or more for heating system 106 to heat the ambient air temperature to at least 72 degrees, depending on a number of factors, such as the size/rating of heating system 106, the size of structure 100, and the difference between the ambient air temperature inside structure 100 and the temperature setpoint. The time when heating system 106 is actively heating the ambient air temperature in structure 100 may be referred to as a "heating period" or "heating cycle" and, conversely during a period of cooling by cooling system 108, a "cooling period" or "cooling cycle".

At block 314, during the heating period, processor 200 may receive a security alert via wireless receiver 210 from a security sensor that has previously been enrolled with thermostat 102 as well as security panel 118. The security alert is transmitted in response to a door or a window being opened. The security alert is, additionally, received and processed by security panel 118 to determine whether or not to cause an escalated security response to occur.

At block 316, in response to receiving the security alert, processor 200 may disable heating system 106 or otherwise cause heating system 106 to stop heating via HVAC communication interface 208, i.e., transmit a signal or close a contact/relay to complete a circuit. In another embodiment, processor 200 starts a timer when it receives the security alert. If the door or window remains open for more than a predetermined time period, such as 3 minutes, processor 200 causes heating system 106 to stop heating. Processor 200 may determine that a door or a window remains open when it does not receive a signal from door security sensor 114 or window security sensor 116 indicating that a door or a window has been closed. Put differently, processor 200 assumes that a door or a window remains open until it receives a subsequent signal from door security sensor 114 or window security sensor 116 indicating otherwise. Causing heating system 106 to stop heating may save energy that would otherwise be wasted, heating the ambient air within structure 100 only to be cooled by the outdoor air entering structure 100 via open door 110 or window 112.

In one embodiment, processor 200 disables heating system 106 by modifying the current temperature setpoint to, in this example, a lower temperature. In this embodiment, for example, processor 200 modifies the current temperature setpoint of 72 degrees to at least the current ambient air temperature as provided by temperature sensor 204 at the time when the security alert is received, or after the predetermined time period has elapsed, if a timer is used to delay disablement of heating system 106. In another embodiment, the current setpoint temperature is modified to a default value that ensures that heating system 106 will not activate, such as 50 degrees, or by a default amount above the current ambient temperature, such as 10 degrees. In either case, processor 200 stores the modified temperature setpoint in memory 202 and uses the modified setpoint temperature to control heating system 106 thereafter, until another security alert is received from the same security sensor that caused disablement of HVAC equipment 104. In essence, modifying the current setpoint temperature to a temperature that is most likely never achieved inside structure 100 effectively disables heating system 106.

At block 318, in response to causing heating system 106 to stop heating, processor 200 may activate indicator 206 in order to notify anyone in proximity to thermostat 102 that HVAC equipment 104 has been deactivated as a result of the open door or window. For example, if indicator 106 comprises an LED, processor 200 may cause the LED to illuminate or flash. If indicator 106 comprises a piezoelectric speaker, processor 200 may cause one or more sounds to occur, such as a beeping sound. In one embodiment, user interface 212 may incorporate indicator 106, i.e., processor 200 may cause user interface 212 to display a notification and/or cause a sound to occur.

At block 320, alternatively or in addition to causing heating system 106 to activate indicator 106, processor 200 may generate and transmit a notification to a remote device, indicating that HVAC equipment 104 has been deactivated as a result of the open door or window. For example, processor 200 may generate and transmit via wide-area communication interface 214 a text message, phone call and/or an email destined for personal electronic device 120, or some other remote electronic device. The notification may comprise an identity of the door or window that has been opened and a day and time that the door or window was opened, as well as an indication as to whether or not heating system 108 was actively heating structure 100 when the security alert was received.

Heating system 106 may remain deactivated for as long as door 110 or window 112 is open.

At block 322, security panel 118 may receive and process the same security alert that was received by wireless receiver 210, either ignoring the security alert when security panel 118 is operating in an off mode of operation, or causing an escalated security response when security panel 118 is operating in a armed-home or an armed-away mode of operation. Thus, the security sensors serve as dual-purposes sensors—operating as HVAC control sensors for use with thermostat 102 and also operating as security sensors for use with security panel 118.

At block 324, processor 200 may receive a second security alert via wireless receiver 210 from door security sensor 114, indicating that door 110 has been closed.

At block 326, in response to receiving the second security alert, processor 200 may cause heating system 106 to resume operation, i.e., to re-enable heating system 106. The second security alert indicates that the door or window that was previously opened has now been closed. However, during the time that heating system 106 was disabled, if thermostat 102 received another security alert from a different security sensor, such as window security sensor 116, then reactivation of heating system 106 may only occur when processor 200 receives indications from both door security sensor 114 and window security sensor 116 that door 110 and window 112 has been closed, respectively.

Processor 200 may reactivate heating system 106 by either sending a signal to heating system 106 to begin heating (i.e., by sending a call for heat or by closing a relay/switch) or by returning the modified setpoint temperature stored in memory 202 to the original, current temperature setpoint, in this example, from 50 degrees to 72 degrees, or to a different setpoint if the day and time indicates that a different setpoint temperature should be used. This would be the case if heating system 106 was disabled at 4:45 pm when the setpoint temperature at that time is 72 degrees, and door 110 was shut at 5:10 pm, when a temperature setpoint of 75 had been programmed into thermostat 102.

Of course, when processor 200 receives the second security alert from door security sensor 114, the second security alert is also received by security panel 118. Security panel 118 then processes the second security alert in order to determine if any action is needed, for example, to send an alert to personal electronic device 120 indicating that door 110 has been closed, or to de-escalate the escalated security response.

At block 328, processor 200 may receive a transmission, via wireless receiver 210, from an enrolled security sensor that is not a security alert. For example, door security sensor 114 may transmit signals that indicate that door security sensor 114 has been tampered with, that its battery is getting low, or a supervisory signal that lets security panel 118 know that door security sensor 114 is still operating normally.

At block 330, processor 200 determines that the transmission is not a security alert. In response, processor 200 ignores the transmission and does not process it any further. In general, there is no need for thermostat 102 to know whether signals other than security alerts are being transmitted by enrolled security sensors. However, these signals are important and are received and processed by security panel 118.

Figure 4A:
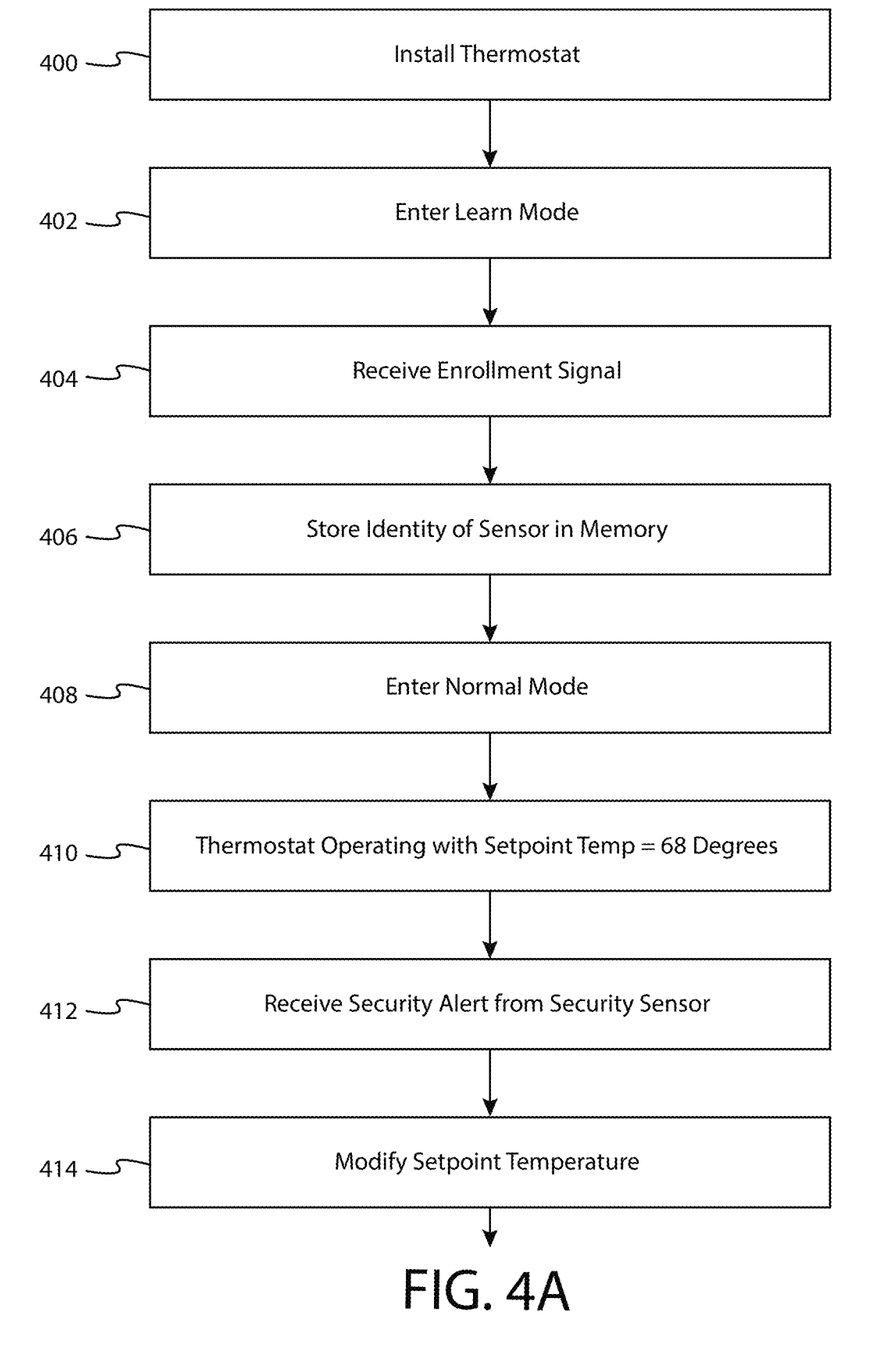
FIGS. 4A and 4B are flow diagrams illustrating one embodiment of another method, performed by the thermostat as shown in FIGS. 1 and 2, for deactivating the HVAC equipment shown in FIG. 1 when the thermostat determines that a door or a window has been opened.
Figure 4B:
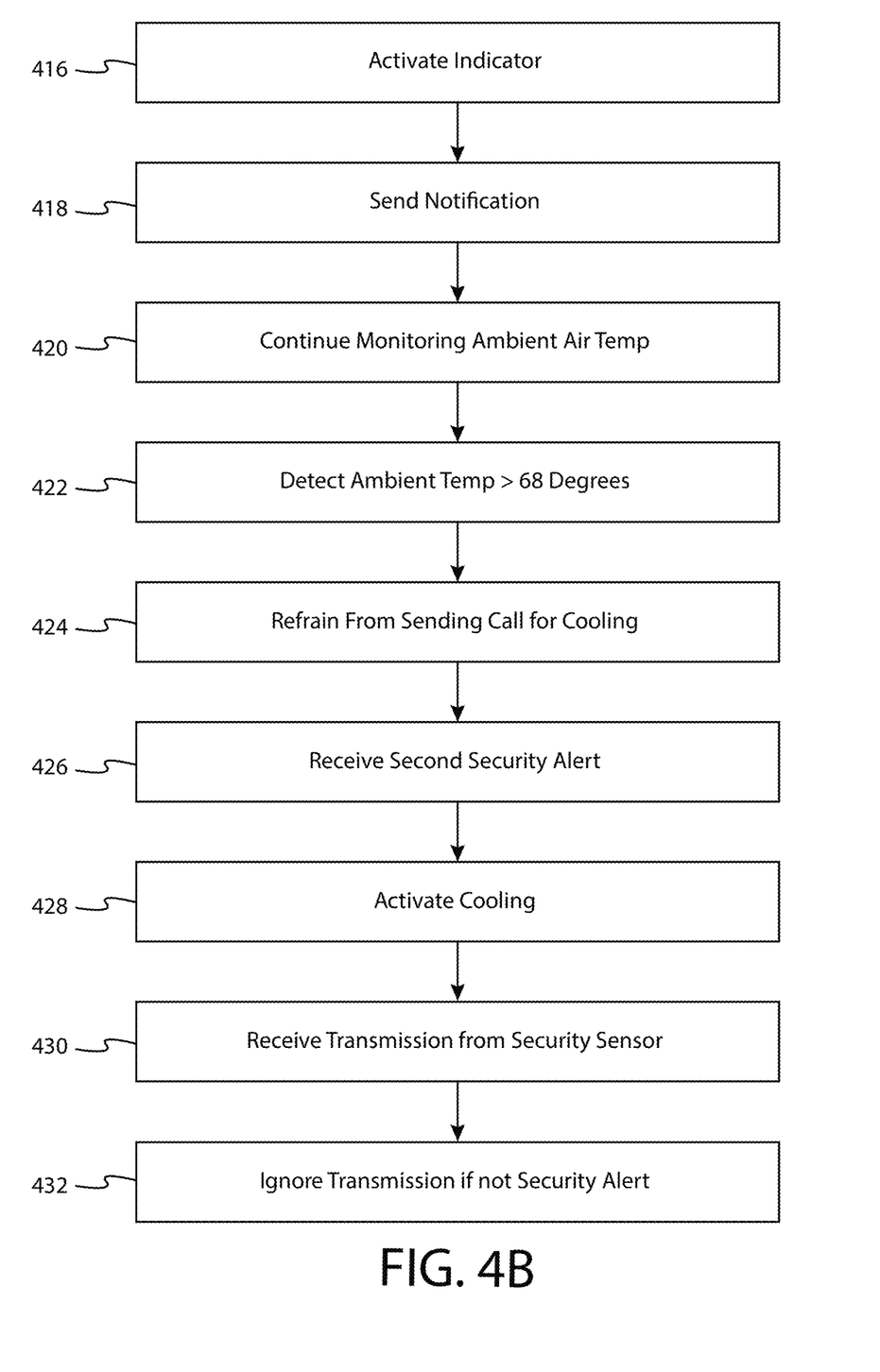

FIGS. 4A and 4B are flow diagrams illustrating one embodiment of another method, performed by thermostat 102, for deactivating HVAC equipment 104 when thermostat 102 determines that a door or a window has been opened. It should be understood that the method described herein with respect to FIG. 4 could alternatively be performed by personal electronic device 120 or by an HVAC component other than thermostat 102, such as heating system 106, cooling system 108, etc. It should also be understood that in some embodiments, not all of the method steps shown in FIG. 4 are performed, and that the order in which the steps are performed may be different in other embodiments.

At block 400, thermostat 102 is installed inside structure 100. Security panel 118 and at least door and window security sensors 114 and 116, respectively, typically have been pre-installed before installation of thermostat 102. That is, door security sensor 114 and window security sensor 116 have each been previously "enrolled" or "learned" into security panel 118, so that security panel 118 may begin monitoring such sensors. Such enrollment may be referred to herein as "active enrollment" or "actively enrolled" to indicate that security panel 118 will process security alerts sent to security panel 118.

In another embodiment, thermostat 102 may be installed inside structure 100 before security panel 118 and door and window security sensors 114 and 116, respectively. In this embodiment, door and window security sensors 114 and 116, respectively, are enrolled into thermostat 102 first, and then later enrolled with security panel 118.

At block 402, a user of thermostat 102 may place thermostat 102 into a "learn" mode, or "enrollment" mode of operation using user interface 212 or using an app installed on personal electronic device 120. Processor 200 receives a signal via user interface 212 or wide-area communication interface 214, as the case may be, instructing processor 200 to enter the enrollment mode of operation.

At block 404, after entering the enrollment mode of operation, processor 200 receives an enrollment signal via wireless receiver 210, from a security sensor, such as door security sensor 114. The enrollment signal comprises at least an identity of door security sensor 114, such as a serial number, MAC address, or some other unique identification code. The enrollment signal may be generated by door security sensor 114 upon the user opening door 110, causing door security sensor 114 to transmit a security alert. In another embodiment, a user may open a case of door security sensor 114 which causes door security sensor 114 to transmit a "tamper" security alert. The enrollment signal may be generated using other techniques well-known in the art.

At block 406, after receiving the enrollment signal, processor 200 stores the identity of door security sensor 114 in memory 202.

Blocks 404 and 406 may be repeated for other sensors, such as window security sensor 116.

At block 408, after one or more sensors have been enrolled, processor 200 exits the enrollment mode of operation and enters a normal mode of operation, i.e., monitoring the ambient air temperature inside structure 100, using temperature sensor 204, and/or one or more remote temperature sensors, and activating HVAC equipment 104 when setpoints are met or exceeded, i.e., actively heating or cooling the ambient air. The normal mode of operation may comprise a heating mode of operation, where heating system 106 is used to heat the ambient air temperature inside structure 100 when the ambient air temperature falls below a temperature setpoint, a cooling mode of operation, where cooling system 108 is used to cool the ambient air temperature inside structure 100 when the ambient air temperature rises above a temperature setpoint, or both modes together.

At block 410, processor 200 is operating with a current temperature setpoint of 68 degrees in a cooling mode of operation, and the current ambient air temperature inside structure 100 is 65 degrees. Cooling system 108 is, therefore, presently inactive, i.e., it is not actively cooling the ambient air inside structure 100. The remainder of the discussion with respect to FIG. 4 shall use this setpoint and mode of operation as an illustrative example. However, the same inventive concepts may be used with a different setpoint in the same, or different, operating mode.

At block 412, processor 200 may receive a security alert via wireless receiver 210 from one of the security sensors that have been previously enrolled with both thermostat 202 and security panel 118, in this example, window security sensor 116. The security alert is transmitted in response to window 112 being opened. The security alert is, additionally, received and processed by security panel 118 to determine whether or not to cause an escalated security response to occur. Processor 200 generally takes no action with respect to cooling system 108, i.e., does not activate or deactivate cooling system 108, as cooling system 108 is not presently actively cooling the ambient air inside structure 100. In another embodiment, however, processor 200 may disable cooling system 108 by sending a command or opening a contact via HVAC communication interface 208.

At block 414, in one embodiment, as a result of receiving the security alert, processor 200 may disable cooling system 108 by modifying the current temperature setpoint to, in this example, a higher temperature. In this embodiment, for example, processor 200 may modify the current temperature setpoint of 68 degrees to at least the current ambient air temperature as provided by temperature sensor 204 at the time when the security alert is received. In another embodiment, the current setpoint temperature is modified to a default value that ensures that cooling system 108 will not activate, such as 80 degrees, or by a default amount above the current ambient temperature, such as 10 degrees. In either case, processor 200 stores the modified temperature setpoint in memory 202 and uses the modified setpoint temperature to control cooling system 108 thereafter, until another security alert is received from the same security sensor that caused disablement of cooling system 108. In essence, modifying the current setpoint temperature to a temperature that is most likely never achieved inside structure 100 effectively disables cooling system 108.

At block 416, in one embodiment, in response to receiving the security alert, processor 200 may activate indicator 206 in order to notify anyone in proximity to thermostat 102 that HVAC equipment 104 has been deactivated as a result of the open window. That is, cooling system 108 will not cool the ambient air inside structure 100 even if the ambient air temperature exceeds the current temperature setpoint of 68 degrees. For example, if indicator 106 comprises an LED, processor 200 may cause the LED to illuminate or flash. If indicator 106 comprises a piezo-electric speaker, processor 200 may cause one or more sounds to occur, such as a beeping sound. In one embodiment, user interface 212 may incorporate indicator 106, i.e., processor 200 may cause user interface 212 to display a notification and/or cause a sound to occur.

At block 418, alternatively or in addition to causing indicator 106 to activate, processor 200 may generate and transmit a notification to a remote device, indicating that cooling system 108 has been deactivated as a result of window 112 opening. For example, processor 200 may generate and transmit via wide-area communication interface 214 a text message, phone call and/or an email destined for personal electronic device 120, or some other remote electronic device. The notification may comprise an identity of the door or window that has been opened and a day and time that the door or window was opened, as well as an indication as to whether or not cooling system 108 was actively cooling structure 100 when the security alert was received.

At block 420, after processor 200 receives the security alert, processor 200 continues monitoring the ambient air temperature within structure 100 via temperature sensor 204.

At block 422, in an embodiment where the current temperature setpoint is not modified upon receiving the security alert, processor 200 determines that the ambient air temperature has exceeded the current setpoint temperature of 68 degrees.

At block 424, in response to determining that the ambient air temperature has exceeded the current setpoint temperature of 68 degrees, processor 200 does not activate cooling system 108, as processor 200 knows that window 112 is open as a result of previously receiving the security alert from window security sensor 116. Activating cooling system 108 while window 112 is open may waste energy and is, therefore, undesirable. Cooling system 108 may remain disabled for as long as window 112 is open.

At block 426, at some later time, processor 200 receives a second security alert via wireless receiver 210 from window security sensor 116, indicating that window 112 has been closed. The second security alert is also received by security panel 118, which processes the second security alert in order to determine if any action is needed, for example, to send an alert to personal electronic device 120 indicating that door 110 has been closed, or to de-escalate the escalated security response.

At block 428, in response to receiving the second security alert, processor 200 may cause cooling system 108 to begin operation, i.e., enable cooling system 108 to begin cooling the ambient air inside structure 100. However, if processor 200 had received another security alert from a different security sensors, such as door security sensor 114, indicating that door 110 had been opened, then processor 200 would not allow cooling system 108 to begin cooling, as cooling is generally allowed only when both door 110 and window 112 are closed.

Processor 200 may activate cooling system 108 by either sending a signal to cooling system 108 to begin cooling (i.e., by sending a call for cooling or by closing a relay/switch) or by returning the modified setpoint temperature stored in memory 202 to the original, current temperature setpoint, in this example, from 80 degrees to 68 degrees, or to a different setpoint if the day and time indicates that a different setpoint temperature should be used, as explained previously.

At block 430, processor 200 may receive a transmission, via wireless receiver 210, from an enrolled security sensor that is not a security alert. For example, door security sensor 114 may transmit signals that indicate that door security sensor 114 has been tampered with, that its battery is getting low, or a supervisory signal that lets security panel 118 know that door security sensor 114 is still operating normally.

At block 432, processor 200 determines that the transmission is not a security alert. In response, processor 200 ignores the transmission and does not process it any further. In general, there is no need for thermostat 102 to know whether signals other than security alerts are being transmitted by enrolled security sensors. However, these signals are important and are received and processed by security panel 118.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:
1. A thermostat, comprising:
a memory for storing processor-executable instructions;

a wireless receiver for receiving security alerts from one or more security sensors;

an HVAC communication interface for sending control signals to HVAC equipment;

a processor coupled to the memory, the wireless receiver and the communication interface, for executing the processor-executable instructions that causes the thermostat to:

enroll, by the processor, a security sensor, the security sensor actively enrolled with a security system;

receive, by the processor via the wireless receiver, a security alert from the security sensor; and deactivate, by the processor, the HVAC equipment in response to receiving the security alert.

2. The thermostat of claim 1, wherein the processor-executable instructions for deactivating the HVAC equipment comprises instructions that cause the thermostat to send, by the processor via the HVAC communication interface, a signal to the HVAC equipment for the HVAC equipment to stop heating or cooling.

3. The thermostat of claim 1, wherein the processor-executable instructions for deactivating the HVAC equipment comprises instructions that cause the thermostat to:

modify, by the processor, a current setpoint temperature stored in the memory to generate a modified setpoint;

store, by the processor, the modified setpoint in the memory; and control, by the processor, the HVAC equipment using the modified setpoint.

4. The thermostat of claim 2, further comprising:

an indicator coupled to the processor;

wherein the processor-executable instructions comprise further processor-executable instructions that causes the thermostat to:

activate, by the processor, the indicator when the processor sends the signal to the HVAC equipment to stop heating or cooling in response to receiving the security alert from the security sensor.

5. The thermostat of claim 1, further comprising:

a second communication interface coupled to the processor;

wherein the processor-executable instructions comprise further processor-executable instructions that causes the thermostat to:

send, by the processor via the second communication interface, a notification that a door or a window is open.

6. The thermostat of claim 3, further comprising:

a second communication interface coupled to the processor;

wherein the processor-executable instructions comprise further processor-executable instructions that causes the thermostat to:

send, by the processor via the second communication interface, a notification that the current setpoint has been modified.

7. The thermostat of claim 1, wherein the processor-executable instructions that cause the thermostat to deactivate the HVAC equipment in response to receiving the security alert comprise further processor-executable instructions that causes the thermostat to:

start a timer in response to receiving the security alert; and when the timer expires, deactivate the HVAC equipment if a second security alert from the security sensor has not been received.

8. A method performed by a thermostat, comprising:

enrolling, by a processor of the thermostat, a security sensor, the security sensor actively enrolled with a security system;

receiving, by the processor via a wireless receiver coupled to the processor, a security alert from the security sensor; and deactivating, by the processor, HVAC equipment in response to receiving the security alert.

9. The method of claim 8, wherein deactivating the HVAC equipment comprises sending, by the processor via an HVAC communication interface coupled to the processor, a signal to an HVAC equipment coupled to the thermostat via the HVAC communication interface for the HVAC equipment to stop heating or cooling.

10. The method of claim 8, wherein deactivating the HVAC equipment comprises:

modifying, by the processor, a current setpoint temperature stored in a memory coupled to the processor to generate a modified setpoint;

storing, by the processor, the modified setpoint in the memory; and controlling, by the processor, the HVAC equipment using the modified setpoint.

11. The method of claim 9, further comprising:

activate, by the processor, an indicator coupled to the processor when the processor sends the signal to the HVAC equipment to stop heating or cooling in response to receiving the security alert from the security sensor.

12. The method of claim 8, further comprising:

sending, by the processor via a second communication interface coupled to the processor, a notification that a door or a window is open.

13. The method of claim 10, further comprising:

sending, by the processor via the second communication interface, a notification that the current setpoint has been modified.

14. The method of claim 8, wherein deactivating the HVAC equipment comprises:

starting a timer in response to receiving the security alert; and when the timer expires, deactivate the HVAC equipment if a second security alert from the security sensor has not been received.

* * * * *